US008127238B2

(12) United States Patent
Gottlieb et al.

(10) Patent No.: US 8,127,238 B2
(45) Date of Patent: Feb. 28, 2012

(54) SYSTEM AND METHOD FOR CONTROLLING ACTIONS WITHIN A PROGRAMMING ENVIRONMENT

(75) Inventors: Harry N. Gottlieb, Chicago, IL (US); Gabriel Val, Evanston, IL (US); Robert Chojnacki, East Dundee, IL (US)

(73) Assignee: The Jellyvision Lab, Inc., Chicago, IL (US)

( * ) Notice: Subject to any disclaimer, the term of this patent is extended or adjusted under 35 U.S.C. 154(b) by 761 days.

(21) Appl. No.: 11/957,066

(22) Filed: Dec. 14, 2007

(65) Prior Publication Data

US 2008/0163084 A1 Jul. 3, 2008

Related U.S. Application Data

(60) Provisional application No. 60/875,071, filed on Dec. 14, 2006, provisional application No. 60/875,179, filed on Dec. 14, 2006.

(51) Int. Cl.
*G06F 3/048* (2006.01)
(52) U.S. Cl. ........ 715/763; 715/716; 715/765; 715/835; 715/781; 715/967
(58) Field of Classification Search .................. 715/716, 715/719, 723, 727, 762, 763, 764, 765, 781, 715/835, 967; 717/106, 109
See application file for complete search history.

(56) References Cited

U.S. PATENT DOCUMENTS 4,538,188 A  8/1985  Barker et al.
(Continued)

FOREIGN PATENT DOCUMENTS

EP  0 438 299 A2  7/1991
(Continued)

OTHER PUBLICATIONS

Dick C. A. Bulterman and Lynda Hardman: "Structured Multimedia Authoring", ACM Transactions on Multimedia Computing, [Online] 2005, XP002487484, Retrieved from the Internet: URL: http://homepages.cwi.nl/{dcab/PDF/tomccap05.pdf> the whole document.

(Continued)

*Primary Examiner* — Xiomar Bautista
(74) *Attorney, Agent, or Firm* — Brinks Hofer Gilson & Lione

(57) ABSTRACT

This patent discloses tools, methods and systems for dynamically visualizing, controlling and modifying the timing of actions that are implemented as part of an interactive multimedia experience. The tools, methods and systems include a timing region that dynamically reflects the timing of at least some of the cells along a selected single path in the multimedia experience and allows a designer to play through the cells and to change the timing of actions associated with the cells.

19 Claims, 6 Drawing Sheets

U.S. PATENT DOCUMENTS

| | | |
|---|---|---|
| 4,831,525 A | 5/1989 | Saito et al. |
| 4,831,580 A | 5/1989 | Yamada |
| 4,852,047 A | 7/1989 | Lavallee et al. |
| 4,875,187 A | 10/1989 | Smith |
| 4,893,256 A | 1/1990 | Rutherfoord et al. |
| 4,931,950 A | 6/1990 | Isle et al. |
| 4,933,880 A | 6/1990 | Borgendale et al. |
| 4,956,773 A | 9/1990 | Saito et al. |
| 5,111,409 A | 5/1992 | Gasper et al. |
| 5,119,474 A | 6/1992 | Beitel et al. |
| 5,261,041 A | 11/1993 | Susman |
| 5,307,456 A | 4/1994 | MacKay |
| 5,386,508 A | 1/1995 | Itonori et al. |
| 5,418,622 A | 5/1995 | Takeuchi |
| 5,430,872 A | 7/1995 | Dahod et al. |
| 5,446,911 A | 8/1995 | Juso et al. |
| 5,515,490 A | 5/1996 | Buchanan et al. |
| 5,519,828 A | 5/1996 | Rayner |
| 5,530,856 A | 6/1996 | Dahod et al. |
| 5,546,529 A | 8/1996 | Bowers et al. |
| 5,555,357 A | 9/1996 | Fernandes et al. |
| 5,581,759 A | 12/1996 | Ohhashi et al. |
| 5,586,311 A * | 12/1996 | Davies et al. ............... 715/764 |
| 5,590,253 A | 12/1996 | Onishi et al. |
| 5,592,602 A | 1/1997 | Edmunds et al. |
| 5,619,636 A | 4/1997 | Sweat et al. |
| 5,630,017 A | 5/1997 | Gasper et al. |
| 5,640,590 A | 6/1997 | Luther |
| 5,692,212 A | 11/1997 | Roach |
| 5,697,788 A | 12/1997 | Ohta |
| 5,708,845 A | 1/1998 | Wistendahl et al. |
| 5,717,879 A | 2/1998 | Moran et al. |
| 5,721,959 A | 2/1998 | Nakamura et al. |
| 5,752,029 A | 5/1998 | Wissner |
| 5,754,851 A | 5/1998 | Wissner |
| 5,806,079 A | 9/1998 | Rivette et al. |
| 5,818,435 A | 10/1998 | Kozuka et al. |
| 5,870,768 A | 2/1999 | Hekmatpour |
| 5,892,507 A | 4/1999 | Moorby et al. |
| 5,893,105 A | 4/1999 | MacLennan |
| 5,905,981 A | 5/1999 | Lawler |
| 6,034,692 A | 3/2000 | Gallery et al. |
| 6,058,333 A | 5/2000 | Klein et al. |
| 6,072,480 A | 6/2000 | Gorbet et al. |
| 6,097,887 A | 8/2000 | Hardikar et al. |
| 6,100,881 A | 8/2000 | Gibbons et al. |
| 6,144,938 A | 11/2000 | Surace et al. |
| 6,154,600 A | 11/2000 | Newman et al. |
| 6,179,490 B1 | 1/2001 | Pruitt |
| 6,184,879 B1 | 2/2001 | Minemura et al. |
| 6,212,674 B1 | 4/2001 | Suckow |
| 6,239,800 B1 | 5/2001 | Mayhew et al. |
| 6,243,857 B1 | 6/2001 | Logan, III et al. |
| 6,314,569 B1 | 11/2001 | Chernock et al. |
| 6,334,103 B1 | 12/2001 | Surace et al. |
| 6,346,945 B1 | 2/2002 | Mansurov et al. |
| 6,356,867 B1 | 3/2002 | Gabai et al. |
| 6,370,683 B1 | 4/2002 | Sobers |
| 6,421,821 B1 | 7/2002 | Lavallee |
| 6,496,208 B1 * | 12/2002 | Bernhardt et al. ............ 715/853 |
| 6,654,803 B1 | 11/2003 | Rochford et al. |
| 6,674,955 B2 | 1/2004 | Matsui et al. |
| 6,754,540 B1 | 6/2004 | McFarland et al. |
| 6,816,174 B2 | 11/2004 | Wu et al. |
| 6,873,344 B2 * | 3/2005 | Samra et al. ................. 715/723 |
| 6,973,639 B2 * | 12/2005 | Hashimoto et al. ........... 717/106 |
| 7,310,784 B1 | 12/2007 | Gottlieb et al. |
| 7,340,715 B2 | 3/2008 | Liu |
| 7,647,577 B2 | 1/2010 | Wang et al. |
| 7,793,219 B1 | 9/2010 | Stratton et al. |
| 2002/0038206 A1 | 3/2002 | Dori |
| 2002/0089527 A1 | 7/2002 | Paradies |
| 2002/0140731 A1 | 10/2002 | Subramaniam et al. |
| 2004/0070594 A1* | 4/2004 | Burke ........................... 345/716 |
| 2004/0196310 A1 | 10/2004 | Aamodt et al. |
| 2007/0227537 A1 | 10/2007 | Bemister et al. |
| 2007/0234196 A1 | 10/2007 | Nicol et al. |
| 2007/0240046 A1 | 10/2007 | Yan et al. |
| 2008/0065977 A1 | 3/2008 | Gottlieb et al. |
| 2008/0104121 A1 | 5/2008 | Gottlieb et al. |
| 2008/0184143 A1 | 7/2008 | Gottlieb et al. |
| 2008/0244376 A1 | 10/2008 | Gottlieb et al. |

FOREIGN PATENT DOCUMENTS

| | | |
|---|---|---|
| EP | 0 661 631 A2 | 7/1995 |
| EP | 1667115 A2 | 6/2006 |
| JP | 63 127333 | 5/1988 |
| JP | 5 257666 A2 | 10/1993 |
| JP | 8 96001 | 4/1996 |
| JP | 8 263536 | 10/1996 |
| JP | 2002 120174 | 4/2002 |
| WO | WO 96/19779 | 6/1996 |
| WO | WO 96/26600 | 8/1996 |

OTHER PUBLICATIONS

PCT International Search Report/Written Opinion of the International Searching Authority (the European Patent Office) regarding Application No. PCT/US2007/087618, dated Jul. 23, 2008, 14 pages.

Quality America Inc., Flowchart/Cause & Effect Features, Jun. 21, 2000, pp. 1-4.

Goofy Animation System, Technical Report 266, Lindsey Ford Department of Computer Science University of Exeter, Exeter EX4 4PT, U.K. Nov. 5, 1993, pp. 1-15.

A Multimedia Presentation Mechanism Permitting Partial Loss of Objects, Han II Kim et al., Dept. of Computer Eng., pp. 847-851 (1992).

STORM Structural and Temporal Object-oRiented Multimedia database system, Michel Adiba, Imag-Lgi, Grenoble University, BP 53, 38041 Grenoble Cedex 9 France, pp. 12-19 (1995).

Shelldrake Developer, http://www.shelldrake.com/Developer/faqs.htm, 3 pages (2000).

Shelldrake Developer, http://www.shelldrake.com/Developer/StoryFirst.htm, 3 pages (2000).

"aIICLEAR User's Guide," Version 4.5, SPSS Inc., 1999 (218 pages).

"Anark Studio™ User Guide," Version date: Feb. 16, 2005. 324 pages.

"Cubase SX/SL 3 Music Creation and Production System," Getting Started, Manual by Anders Nordmark, Steinberg Media Technologies GmbH, 2004. 268 pages.

"Cubase SX/SL 3 Music Creation and Production System," Operation Manual, Manual by Anders Nordmark, Steinberg Media Technologies GmbH, 2004. 810 pages.

"Macromedia Flash™MX 2004 Getting Started with Flash," Macromedia, Inc. 2004. 68 pages.

"Macromedia Flash™MX 2004 Using Flash," Macromedia, Inc. 2004. 498 pages.

"Macromedia Authorware7 Using Authorware 7," Macromedia, Inc., 2003. 286 pages.

Watts et al., "The SFC Editor: A Graphical Tool for Algorithm Development, Consortium for Computing Science in Colleges," 2004, pp. 73-85.

PCT International Search Report/Written Opinion of the International Searching Authority (the European Patent Office) regarding Application No. PCT/US08/53407, dated May 23, 2008, 8 pages.

PCT International Search Report/Written Opinion of the International Searching Authority (the European Patent Office) regarding Application No. PCT/US2007/087623, dated May 8, 2008, 12 pages.

"Using Authorware passage", Using Authorware, Macromedia, US, Aug. 2001, page complete, XP002343353, pp. 13, 33-34, 41, 48.

Shih, T. K. et al: "Multimedia presentation design using data flow diagrams", Intelligent Processing Systems, 1997, ICIPS '97, 1997 IEEE International Conference on Beijing, China, Oct. 28-31, 1997, New York, NY, USA, IEEE, US, vol. 2, Oct. 28, 1997, pp. 1716-1720, XP010276159, ISBN: 0-7803-4253-4, the whole document.

Bell, M. A. et al.: "CALVIN-courseware authoring language using visual notation", Visual Languages, 1993, Proceedings 1993 IEEE Symposium on Bergen, Norway, Aug. 24-27, 1993, Los Alamitos, CA, USA, IEEE Comp. Soc., US, Aug. 24, 1993, pp. 225-230, XP010032717, ISBN: 0-8186-3970-9, the whole document.

Office Action regarding U.S. Appl. No. 11/957,076 dated Dec. 7, 2010.
Office Action regarding U.S. Appl. No. 11/957,076 dated Jun. 7, 2011.
Office Action regarding U.S. Appl. No. 11/925,460 dated Jul. 7, 2010.
Office Action regarding U.S. Appl. No. 11/925,460 dated Jan. 28, 2011.
Office Action regarding U.S. Appl. No. 11/925,460 dated Aug. 17, 2011.
Office Action regarding U.S. Appl. No. 12/028,283 dated Feb. 14, 2011.
Office Action regarding U.S. Appl. No. 12/028,283 dated Oct. 24, 2011.
Office Action regarding U.S. Appl. No. 11/975,577 dated Feb. 28, 2011.
Office Action regarding U.S. Appl. No. 11/975,577 dated Nov. 3, 2011.

* cited by examiner

SYSTEM AND METHOD FOR CONTROLLING ACTIONS WITHIN A PROGRAMMING ENVIRONMENT

CROSS REFERENCE TO RELATED APPLICATIONS

The present patent document claims the benefit of the filing date under 35 U.S.C. §119(e) of Provisional U.S. Patent Application Ser. No. 60/875,071, filed Dec. 14, 2006, which is hereby incorporated by reference.

This patent is related to co-pending, Provisional U.S. Patent Application Ser. No. 60/875,179, titled, "Methods for Identifying Actions in a Flowchart," filed on Dec. 14, 2006; and U.S. patent application Ser. No. 10/038,527, titled, "Method for Identifying Cells in a Path in a Flowchart and for Synchronizing Graphical and Textual Views of a Flowchart," filed on Jan. 2, 2002. The entire contents of these related patent applications are incorporated herein by reference for all purposes.

BACKGROUND

A multimedia experience refers to the use of media in an interactive environment. The media generally include one or more types of information content, including for example, text, audio, graphics, animation, and video. During a multimedia experience, the media is presented to an end-user according to a logical sequence that can be affected by the end-user's actions.

A multimedia experience can be modeled as a flowchart that defines the logical sequence for playback of the multimedia experience. Such a flowchart generally consists of a sequence of linked cells that directly or indirectly reference media assets to be played by an application in a predefined order. The selection of which media referenced in the cells will be played can depend, in part, upon the choices made by end-users during each playback session of the multimedia experience. Flowcharts can be prepared by hand using pencil and paper or can be prepared electronically using a computer. Some software applications require a user to build a flowchart by drawing graphical shapes and then typing text into each graphical shape.

Often, during a playback session, the media referenced by several cells are presented to the end user in a coordinated manner, either simultaneously or in short succession of one another. In these situations, one cell is considered to represent playback of primary media off of which related cells representing secondary media are timed. In order to illustrate the dependencies between coordinated media, it is known to display the secondary cells on a side branch connecting these cells to the primary cell. The side branch may be visually distinct from other branches in the flowchart. This approach is disclosed, described and presented in related U.S. patent application Ser. No. 10/038,527, titled, "Method for Identifying Cell in a Path in a Flowchart and for Synchronizing Graphical and Textual Views of a Flowchart," filed on Jan. 2, 2002.

The timing and flow of the experience and the user's interaction therewith can be difficult and time consuming to establish. It is desirable to interact and modify the timing of the experience along a particular path within the experience in a fast and dynamic manner to produce and provide a multimedia experience. In order to produce and provide a desirable multimedia experience, there exists a need for tools, methods and systems to facilitate the modification and interaction with components of a multimedia experience in an efficient manner.

SUMMARY

This patent discloses tools, methods and systems for dynamically visualizing, controlling and modifying the timing of actions that are implemented as part of an interactive multimedia experience. The tools, methods and systems include a timing region that dynamically reflects the timing of at least some of the cells along a selected single path in the multimedia experience and allows a designer to play through the cells and to change the timing of actions associated with the cells.

Additional features and advantages of the present invention are described in, and will be apparent from, the following Detailed Description and the figures.

DETAILED DESCRIPTION

Disclosed and described herein are tools, systems, methods and embodiments that may be implemented using software and/or hardware components. For example, the one embodiment can be implemented with a software application stored on a memory and (i.e., computer-readable program code) executable by a processor of a general-purpose computer. Alternatively, some or all of the functionality of the application can be implemented with application-specific hardware components. For simplicity, the term "application" shall be used herein to refer generally to the entity (be it software and/or hardware) used to implement the embodiments described below. The term "tool" shall be used interchangeably with the term "application."

I. Multimedia Creation

Figure 1A:
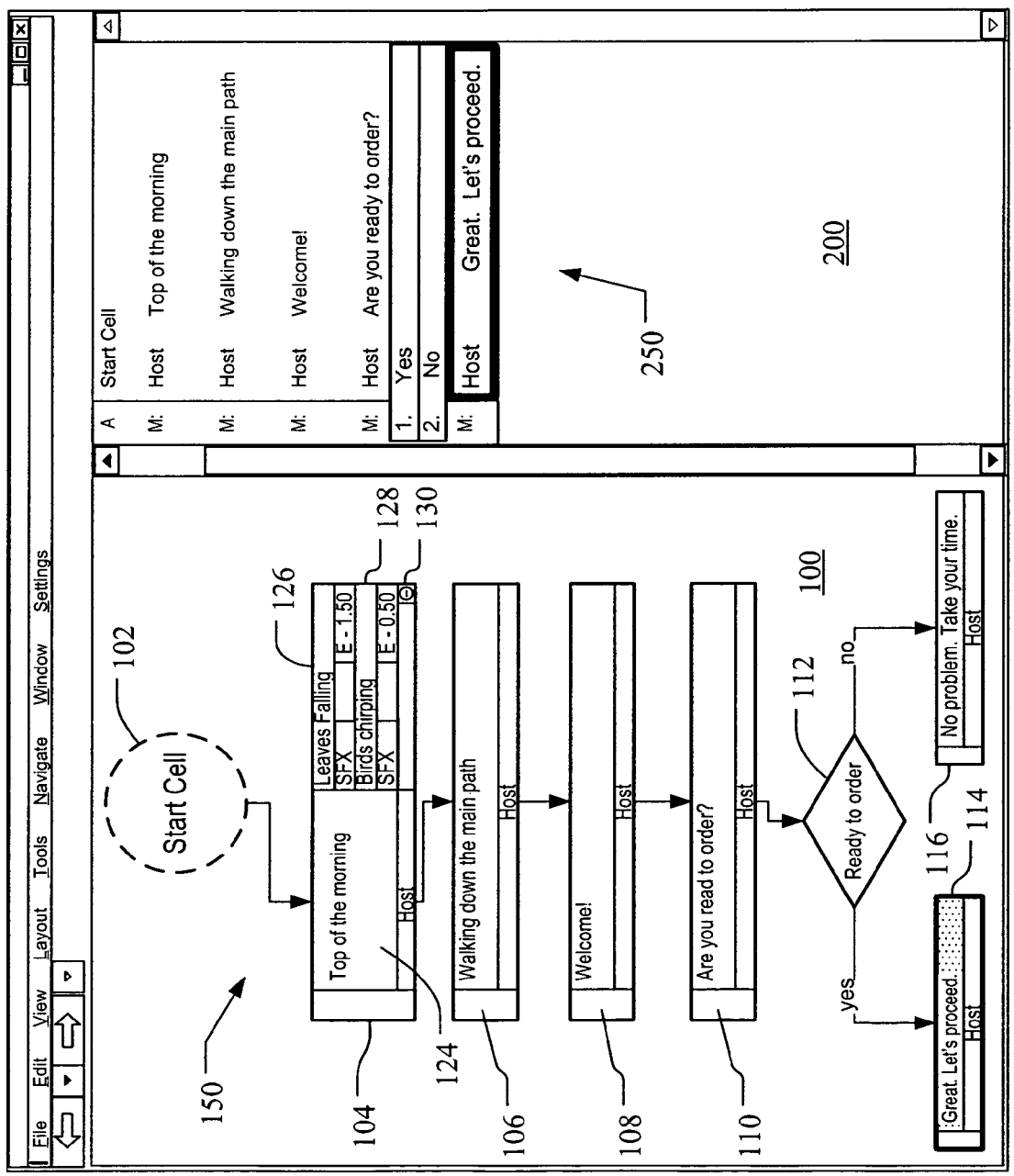
FIGS. 1A and 1B illustrate a flowchart representation of a sample interactive multimedia experience.
Figure 1B:
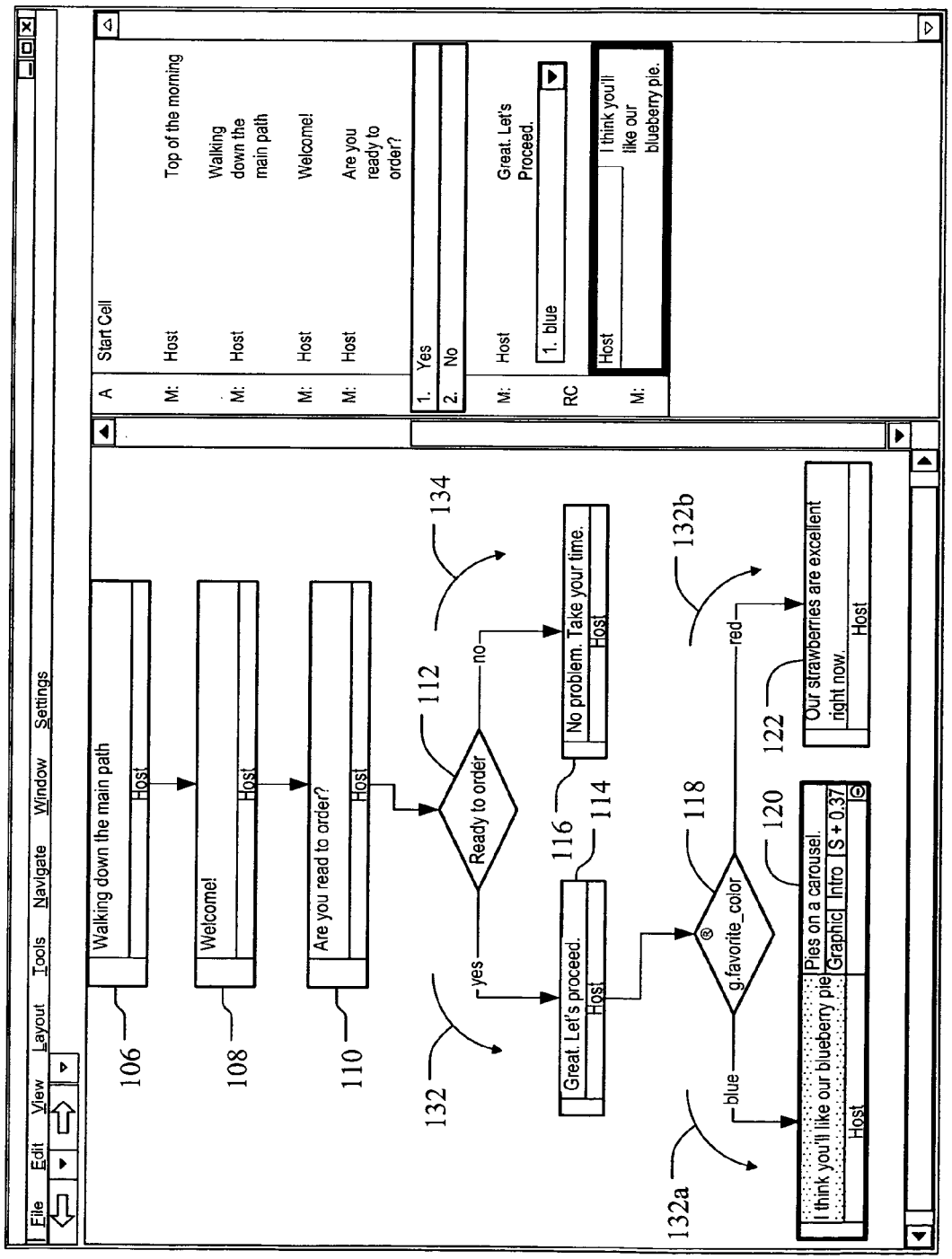

Turning now to the drawings, FIGS. 1A and 1B depict a display or graphical user interface (GUI) generated by one embodiment of an exemplary application or tool. The GUI illustrated in FIGS. 1A and 1B includes two display regions or windows 100, 200. As used herein, the term "display region" or "display window" refers to an area of the GUI generated and/or provided on one or more display devices, e.g., a cathode ray tube (CRT), a liquid crystal display (LCD), etc. Each display region 100, 200 can be a separate window or the display regions 100, 200 can be different areas in a single window. The first and second display regions 100, 200 can be fixed or movable and can be non-overlapping (as shown in FIG. 1) or can overlap each other. Additionally, the first and second display regions 100, 200 can be alternately active or in focus (one then the other) in response to a command from the application and/or in response to selection by the user. The first display region 100 may be referred to herein as the "Structure Window," and the second display region 200 may be referred to herein as the "Editor Pane."

The first display region 100 provides or projects an exemplary flowchart 150 representative of a multimedia experience. As used herein, the term "flowchart" refers to a series of linked graphical icons, symbols or cells. The lines in the flowchart show how the cells are connected and/or interconnected. Moreover, the position and arrangement of the cells within the flowchart define the order in which they are traversed in operation. The Structure Window, i.e., the first display region 100, is so referred to because it displays the layout, i.e., the structure, the cells and the connecting lines that comprise the multimedia experience represented by the flowchart 150. The first display region 100 can display the exemplary flowchart 150. Alternatively, a more complex, detailed and/or extended version of the flowchart 150 may be displayed in the first display region 100 as shown in FIGS. 1A and 1B by utilizing, for example, a scroll bar to translate up or down or through the screen to reveal portions of the extended flowchart that may not always be visible within the first display region 100.

The flowchart 150 includes a plurality of icons or cells (cells 102 to 122). As described in greater detail further below, the cells 102 to 122 represent media content and user interactivity and the links connecting the cells represent the flow of the multimedia experience through time. The shape and/or configuration of the cells 102 to 122 represent the function or type of cell. For example, the rectangular-shaped are referred to as "simple cells" and the diamond-shaped are referred to as "conditional cells." The simple cells each contain a single link or branch that connects to another cell. For example, the simple cell 108 connects or branches to the simple cell 110 which, in turn, connects or branches to the conditional cell 112. The conditional cell 112, unlike the simple cells, contains multiple connections or branches links to multiple cells. The branching links are associated with conditions necessary for that branching link to be followed. For example, the conditional cell 112 branches to the simple cells 114 and 116 via a branch 132 and a branch 134, respectively. The branch 132 to the cell 114 is followed if the condition "ready to order" is true, while the branch 134 to the cell 116 is followed if the condition is false. It will be understood that the terms "simple cell" and "conditional cells" as discussed above, describe the flowchart connections or connectivity associated with the different types of cells. These descriptive labels are not intended to describe or limit the functionality of the individual cells, but instead describe how the cells connect or interact with other cells to define the experience. Moreover, that the graphical symbols representative of the cells, etc., described herein are intended as illustrative rather than limiting and that, according to the present disclosure, other types of symbols or representation can be used to illustrate the cells in a flowchart.

The cell 114, in turn, connects to a reference cell 118. The reference cell 118 includes or stores information or a value provide by the user or another input in another portion of the multimedia experience. For example, in the exemplary embodiment generally shown in FIG. 1B, the user may have been queried earlier in the multimedia experience to choose between "blue" and "red" as a favorite color. The results of this previously inputted selection is stored in the reference cell 118 as the value of the variable "g.favorite_color." If the user previously indicated that the preferred color was "blue," upon reaching the reference cell 118 the experience would proceed to the media cell 120 (media cells are described in greater detail further below). Alternatively, if the user previously indicated that the preferred color was "red," upon reaching the reference cell 118 and the experience would proceed to the simple cell 122. The direction of the user to either media cell 120 or simple cell 122 can occur automatically because the information necessary to control the direction or flow of the experience has previously been provided and stored. Thus, depending on the user's previous selection of "blue" or "red," the reference cell 118 connects to the media cell 120 and announces "I think you'll like our blueberry pies" while playing an image of a pie carousel that began 0.37 (S+0.37) seconds after the announcement started, or connects to simple cell 122 and announces "Our strawberries are excellent right now." Utilizing a reference cell, the flowchart 150 can automatically and conditionally select between a branch 132a and a branch 132b based on the value of the stored variable "g.favorite_color." In this way, the flow and experience provided by the flowchart 150 can seem, from the user's perspective, to be customized or tailored to their tastes and/or desires.

It should be noted that a cell can be a "grouped cell" and contain two or more individual cells (simple cells or conditional cells). The group cells may be utilized to simplify the display of a flowchart representing a multimedia experience by grouping multiple, typically related, cells together in a single graphical construct or cell. In addition to simple and conditional cells, a group cell can contain other group cells (i.e., groups cells can be nested) and other types of cells, such as "go-to" cells, "alias" cells, and other types of cells are described below.

Go-to cells can be used to direct or route the steps or operation of the flowchart 150 from one cell to another. For example, the cell 106 could be a go-to cell that directs the flow of the multimedia experience to the conditional cell 112. In this example, the action would skip over, i.e., not execute or experience the element or actions associated with the skipped cells 108 and 110. Alternatively, the go-to cell of the previous example could be utilized in place of a branching link to direct the action or flow of the multimedia experience from the cell 106 to the simple cell 108. In this way, go-to cells can be utilized to organize the flowchart 150 to improve the readability and usability of the overall information presentation. Alias cells can be used to mimic the function/operation of another cell. Thus, if the application designer or programmer decides to reuse sections or elements of the flowchart 150, the alias cell provides an effective tool or pointer for implementing this course of action.

Generally, it will be understood that the cells within the exemplary flowchart 150, or any other flowchart or construct that may be designed in accordance with the teachings provided herein, can contain any suitable content, action or information. For example, each cell can be configured to: (i) contain a text message for presentation to the user; (ii) prompt or query the user for information and/or an input; (iii) evaluated provided information or input based on a pre-programmed logic or set of conditions, etc. In one embodiment, the conditional cell 112 can prompt the user to input "Yes" or "No" using a user interface device, such as a keyboard, mouse, microphone, remote control, telephone, or any other type of device. The conditional cell 112 also determines whether the user input is "Yes" or "No." If the user input is "Yes," the branch 132 leading to cell 114 is followed, and the application runs the script "Great. Let's Proceed." If the user input is "No," the branch 134 leading to cell 116 is followed, and the application runs the script "No problem. Take your time."

According to the present embodiment, a cell can also contain actions that are implemented by the application, or by another program that is linked, embedded or otherwise connected to the application, in a coordinated manner, either simultaneously or in short succession of one another, when the cell is activated or played. For example, a cell can contain coordinated instructions to trigger a piece of media, gather user input, generate visual or oral information, send/receive information or media to a database, process data, perform a calculation, or perform other functions, such as describing how and when media should be played. Examples of media assets that may be linked or connected to the cell include, but are not limited to, digital audio/video objects representing still art, animation, graphics, on-screen text, music, sound effects, and voiceover dialogue. The term "media cell" shall be used herein to refer generally to a cell containing one or more actions whose timing is coordinated. Conceptually, a media cell acts as a container for actions, or references to actions, that trigger media playback. A media cell can contain multiple actions for executing media playback that are implemented by the application (or by another application) in a coordinated manner when the cell is played. In particular, each media cell includes at least one primary action and possibly one or more secondary action whose timing is coordinated with the primary action.

The primary action of a media cell preferably triggers playback of media that conveys a comprehensive message at a particular moment of the experience, such as audio or video of an actor speaking. A secondary action preferably triggers playback media that illustrates, reinforces and/or supports the comprehensive message being delivered through the primary action, such as text displaying all or a subset of the script performed by the actor and/or graphics that help illustrate the message of the actor's script. Preferably, the timing of a secondary action of a media cell is based on a time X before or after the beginning or end of the primary action of that media cell. Different actions in a cell can trigger playback of media that execute simultaneously with each other. It will be understood that the timing of a secondary action can be coordinated with the timing of a primary action using other timing mechanisms. For example, the primary and secondary actions could be timed off of a common clock, the secondary action could be timed off of another secondary action that is timed off of the primary action, etc. Thus, each media cell contains one or more actions whose timing is coordinated. Moreover, the primary and secondary actions may be initiated to coincide with each other, e.g., to show an image and play a sound clip, or may be activated sequentially. Referring to the flowchart 150 illustrated in FIG. 1A, the exemplary media cell 104 includes one primary action 124 and two secondary actions 126 and 128.

In this way, the application distinguishes between media cells generally representing application flow and the coordinated actions performed by a cell when it is "played." In particular, the media cell is a compound cell where several discrete and timed events can occur when flow reaches the cell during playback. When playback reaches a particular cell, the application and/or a runtime engine will generate a signal to invoke the cell's primary action, for example, for executing playback of a media asset referenced by the cell. The application and/or runtime engine will also generate signals to invoke any of the cell's secondary actions based on timing coordinated with the timing of the primary action. Thus, media cells may function as placeholders for actions to be executed within the overall progression of the application at runtime. Coordinated actions, such as those corresponding to the presentation or modification of media content during runtime flow, can be modeled internally in a media cell as separate objects themselves.

The exemplary cells 102 to 122, when run or played during the execution of the steps or actions represented by the flowchart 150, provide an interactive multimedia experience for the user. In this exemplary embodiment, the interactive multimedia experience consists of spoken or verbal scripts accompanied by on-screen text and graphics, and is executed and proceeds according to the logical flowcharted sequence that is established by the programmer and affected or interacted with by the user's actions. The cells 102 to 122 represent distinct sequences, portions or moments within the overall progression of the interactive multimedia experience and are arranged in the flowchart 150 in the order in which they are to be executed in operation.

For example, when the exemplary flowchart 150 executes, the media cell 104 initiated the primary action 124 which, in turn, plays an audio file such as, for example, a .wav file, a mp3 file, a .m4p file, etc., to greet the user with a recorded voice announcing "Top of the Morning." Subsequently, the media cell 104 executes the secondary action 126 and 128 in a timed manner relative to the primary action 124. In this embodiment, the secondary actions 126 and 128 include sound effects selected to enhance and augment the primary action and/or the interactive multimedia experience for the user. The secondary action 126 is timed to execute and begin playing a "Leaves Falling" sound effect one and a half (1.50) seconds before the end completion of the primary action 124. Similarly, the secondary action 128 is timed to execute and begin playing a "Birds Chirping" sound effect zero point five (0.50) seconds before the completion of the primary action 124. Thus, the "Birds Chirping" sound effect initiates one (1.00) second after the initiation of the "Leaves Falling."

The cell 106, upon completion of all actions associated with the cell 104, executes an audio file which may, for example, be the sound of footsteps or alternatively may voice the phrase "Walking Down the Main Path" as its primary, and in this instance only, action. The cell 108, in turn, executes an audio file that voices the phrase "Welcome." Similarly, the cell 110 executes an audio file voicing the question "Are You Ready to Order?" The application, in turn, pauses or waits until the user responds to this query. The application proceeds to the conditional cell 112, and depending on the user's response, an audio file voicing the phrase "Great. Let's Proceed." is executed or played at the cell 114 or an audio file voicing the phrase "No Problem. Take Your Time." is executed or played at the cell 116. In this way, the multimedia experience can be designed to provide an interactive conversation interface that can be used to communicate ideas and information in an audio and/or visual environment, such as interactive computer games, commercials, guided tours, auctions, stories, and news, health, or financial services. The interface can be implemented with wired or wireless equipment that includes both audio and video output devices (such as a home computer or television) as well as with equipment that includes only an audio output device (such as a conventional telephone) or only a video output device. It is important to note that these embodiments can be used in flowchart applications that are unrelated to an interactive multimedia experience. Accordingly, a specific type of cell should not be read into the claims unless explicitly recited therein.

The secondary actions 126 and 128 of the media cell 104 may be displayed in a variety of manners such as, for example, in separate columns, as icons, in a tabbed format, etc. In one embodiment, the secondary actions 126 and 128 associated with the media cell 104 may be stacked or vertically aligned according to the chronological order in which they are to be executed. For example, the media for the secondary actions 126 and 128 begin execution in the same order in which they are displayed in the flowchart 150 shown in FIG. 1A. Additional secondary actions, media cell properties, media cell characteristics or available information may be selectively revealed of hidden utilizing a minimize and restore button 130 positioned adjacent to the media cell 104 and the secondary actions 126 and 128.

The secondary actions 126 and 128 associated with the media cell 104 include timing values that control when, before the conclusion of the primary action 124, each secondary action is to be initiated. For example, the timing value for the secondary action 126, which is identified as "E−1.50," indicates that the media associated with the "Leaves Falling" secondary action 126 begins playing one and a half seconds (1.50) before the conclusion or end (E) of the "Top of the Morning" primary action 114. Similarly, the timing value identified as "E−0.50" indicates that the secondary action 128 executes zero point five (0.50) seconds before the end (E) of the primary action 124. Alternatively, the timing of a secondary action can be based on a time X after the end of a primary action, in which case the timing value can be indicated as "E+X", where "+X" indicates additional time or a pause between the end of the primary action 124 and the initiation of the secondary action. In another embodiment, if the timing of a secondary action is based on a time "X" before the start (S) of the primary action, the timing value can be indicated as "S−X", where "S" is the start identifier and "−X" indicates the span of time before the primary action is initiated. In yet another embodiment, if the timing of a secondary action is based on a time X after the start of a primary action, the timing value can be indicated as "S+X" and follows the same convention discussed above.

The content, actions and/or information contained within the cells along a particular path of the flowchart 150 may be organized and displayed in the second display region 200 (the Editor Pane). The additional display of this information, typically associated with the primary actions, allows the user to read through the content and information provided within a single path of the flow chart 150 regardless of the cells in the other paths. For example, the information presented within the second display region 200 in the exemplary embodiment shown in FIGS. 1A and 1B includes the text associated with the primary actions from cells 104 to 114, 118 and 120. In this exemplary embodiment, the second display region 200 contains a textual view 250 of the cells 102 to 114, 118 and 120 in the order in which the primary actions and/or information appear in the flowchart 150. Thus, the embodiment illustrates, the information along a single path that includes the common flowchart path defined between 102 and 112 and branches 132 and 132a (which includes cells 114, 118 and 120) are displayed in the second display region 200.

The textual view 250 generally shows a "description" of the primary action of a cell, e.g., the text that is contained in the primary action, the line of dialogue that will be voiced by the primary action, the description of the animation or of the special effect (SFX) that will be played by the primary action, etc. The content displayed in the textual view 250 can also contain other cell "properties," such as: (i) the font of displayed text; (ii) the name of the actor who will provide the media content; (iii) the cell's timing relative to other cells; (iv) the volume at which audio content of the cell should be played; (v) the frames per second of animation and other information. Cell properties can also be displayed in a third display region (not shown). It should be noted that the textual view 250 is not limited to text characters, this view could include the graphics or icons of pictures, movies, media clips, etc. that may be displayed/connected to the primary action of the cell. For example, the text of the cell can also be supported with a graphics button or thumbnail image next to the text that indicates the type of media in the cell, e.g., a button with a little horn indicating a SFX, and is clickable to open a properties window of the cell, to playback the media, or to perform other functions.

According to the present embodiment the primary action and the related secondary actions are displayed in separate areas within the media cell, although it should be understood that the application may implement other methods or alternate embodiments to identify and to differentiate the secondary actions of a media cell from the primary action of the cell. For example, the secondary actions can be displayed in the first display region adjacent or proximate the media cell according to their chronological order of execution. The positioning of the secondary actions relative to the media cell would identify their child-parent relationship with the primary action of the media cell. Visual cues can also be provided, for example, links connecting each the secondary actions to the primary action, so as to visually reinforce the child-parent relationship between the secondary action and the primary action and their membership in the same group.

In another alternate embodiment, the textual view in the second display region can show both a description of the primary action and the descriptions of the secondary action in the order of their execution. For example, the textual view can display the primary action in a first column and the secondary action next to the primary action in a second column. In yet another alternate embodiment, the secondary actions of the media cell can be displayed in a fourth display region separate from the first and second display regions, the fourth display region being associated and/or visually linked with the media cell.

II. Multimedia Control

It will be understood that in order to generate a smoothly functioning multimedia experience, it may be necessary to review, edit, adjust and tweak the timing of individual cells 104 to 122 of the flowchart 150, including the primary action and secondary actions associated with each of these cells. Moreover, it will be understood that the cells 106 to 122 may contain greater or fewer secondary actions than the illustrated cell 104 based, in part, on the complexity and desirability of these actions in the overall layout and design of the interactive multimedia experience. Often, the programmer or designer of the multimedia experience represented by the flow chart 150 will require changes in the characteristics such as the timing, order and flow of the cells associated with a particular path of the flowchart 150. In order to minimize the time necessary to test the application flow along each of the separate paths (see, for example, the different paths along the branches 132 and 134 and the branches 132a and 132b) within the flowchart 150, the programmer may dynamically visualize and adjust the timing of the cells along each single path and their associated primary and secondary actions.

Figure 2:
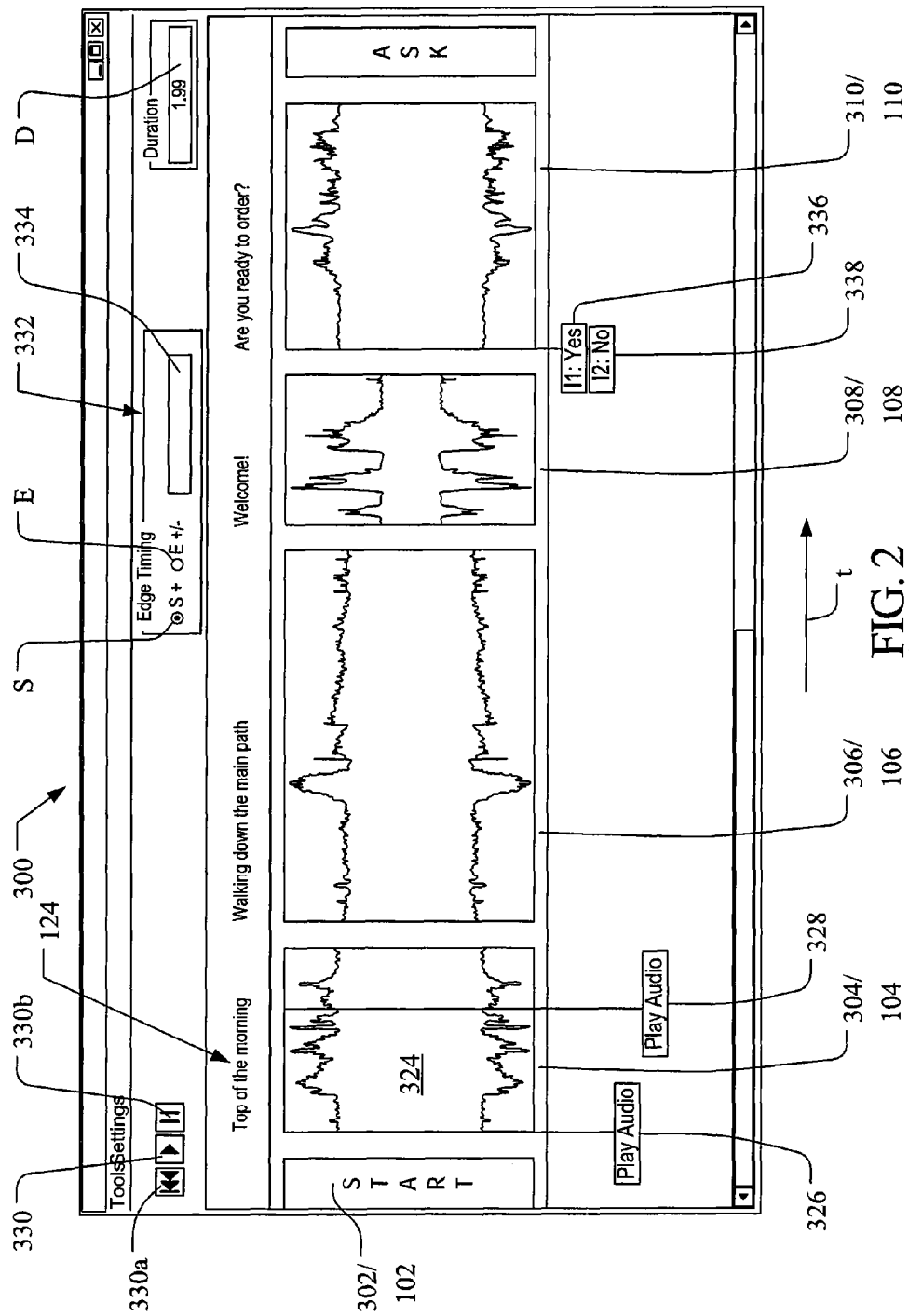
FIG. 2 illustrates an embodiment of a timing tool that may be utilized to visualize and modify the timing of cells of the flowchart laid out in FIGS. 1A and 1B.

FIG. 2 illustrates a timing region or control window 300 constructed in accordance with the teaching and disclosure presented herein. In this embodiment, the timing region 300 provides a visualization of the timing for the cells 102 to 112, including the primary and secondary actions 124, 126 and 128 of the cell 104. For example, the timing region 300 includes numerous timing panes 302 to 310 that correspond to the cells 102 to 110 which, in turn, form part of a single path of the flowchart 150. Each of the timing panes 302 to 310 visually represents the playing or initiation of audio or video files and/or the presentation of text or interactive controls represented by the cells 102 to 110, as a function of time, e.g., along a time axis t. In the example illustrated in FIG. 2, the timing pane 304 displays a waveform 324 of the audio file to be played by the primary action 124 of the cell 104. The waveform 324 states the phrase "Top of the Morning." The runtime or length of time that the primary action 124 takes to complete is represented as a function of the time axis t and is shown in the duration window D. The timing pane 304 may further include a "play head" or visual indicator of the playback of, for example, audio that is represented by a waveform 340, discussed in below. The playhead, in one embodiment may be a vertical line that sweeps from left to right during playback or execution of the primary action 124 within each of the timing panes 302 to 310. The playhead can allow the user to simultaneously visualize what is being heard, making it clear precisely when each of the secondary actions 126 and 128 will be executed relative to the audio.

The timing pane 304 further includes action indicators or cues 326 and 328 that correspond, respectively, to the secondary actions 126 and 128 of the cell 104. The action indicators 326 and 328 are textual and/or graphic representations of the secondary action 126 and 128 associated with the cell 104. The action indicator 326 marks the initiation of the secondary action 126 which, in the present example, plays an audio file that represents the sounds of leaves falling. Similarly, the action indicator 328 marks the initiation of the secondary action 128 which, in the present example, plays an audio file that represents the sounds of birds chirping. It will be understood that an action indicator could represent any type of secondary action and additional secondary actions and corresponding action indicators may be associated with each of the timing panes in the timing region 300 representing the cells in the flow chart 150.

Each of the actions 124, 126 and 128 associated with the cell 104, and their respective timing and interaction, is graphically and interactively represented by the waveform 324 and action indicators 326 and 328 within the timing pane 304. As previously discussed, the action indicators 326 and 328 display to the programmer or designer of the multimedia experience the timing of the secondary actions 126 and 128 relative to the primary action 124. The action indicators 326 and 328 can be selected, manipulated and adjusted with respect to the time axis t to modify or change the timing of the secondary actions 126 and 128 relative to playback of the audio associated with the primary action 124, as represented by the waveform 324.

For example, by selecting one of the action indicators 326 and 328, the designer can drag or move the selected action indicator along the time axis t relative to the timing pane 304. By changing the position of the action indicators 326 and 328 in this way, the designer can make immediate, dynamic adjustments to the timing of the secondary actions 126 and 128 relative to the primary action 124 within the timing region 300. Also, the programmer or designer of the multimedia experience may select one of the action indicators 326 and 328 and adjust its edge timing 332 within the timing region 300 by entering numerical time values into an input field 334 and indicating whether the event should occur relative to the start (S) or end (E) of the corresponding primary action.

In addition to representing the timing of secondary actions, action indicators can also represent the timing of other cells. For example, the cell 110 and the conditional cell 112 of the flowchart 150 are respectively represented by the timing pane 310 and the action indicators 336 and 338. The cell 110 as its primary, and in this example its sole action, presents the user with the question "Are you ready to order?" By turning to the timing pane 310, the possible responses, e.g., "Yes" and "No," associated with the cell 112 are presented to the user as the cell 110 begins to play. In this example, the action indicator 336 represents the "Yes" response and the action indicator 338 represents the "No" response. Depending upon the user-selected response, the flowchart 150 proceeds along the branch 132 or the branch 134 as shown relative to the conditional cell 112 in FIGS. 1A and 1B. The action indicators 336 and 338 can be selected, manipulated and adjusted as described above to modify or change the timing of the presentation of the "Yes" action indicator 336 and the "No" action indicator 338 by the cell 112 relative to the execution of the cell 110.

The programmer or designer can, in turn, by selecting a play button 330 playback the cells of the flowchart 150 associated with each of the timing panes within the timing region 300. The designer can observe the flow of time relative to the waveforms displayed in the timing panes and the action indicators associated with the timing panes. Other audio or execution controls, for example, the controls 330a and 330b may be utilized to rewind or reverse (330a) or pause (330b) the playback of the waveforms associated with each of the timing panes within the timing region 300. In this way, it is possible to dynamically modify and iteratively evaluate the timing for the cells, including their primary and secondary actions, associated with the timing panes within the timing region 300. This process affords or provides a substantial time savings during design, production and testing of interactive multimedia experiences.

Figure 3A:
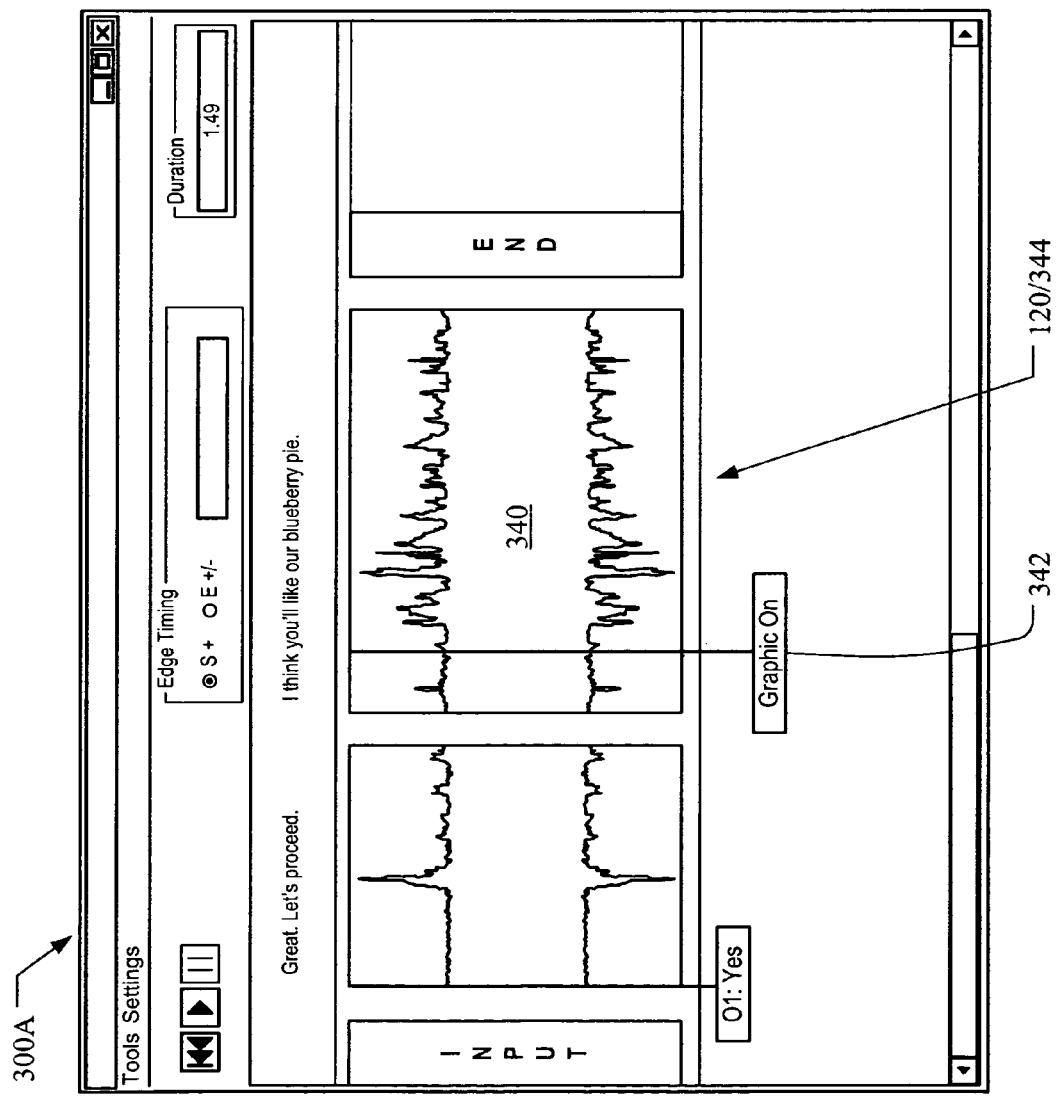
FIGS. 3A and 3B illustrate embodiments of a timing tool that may be utilized to visualize and modify the timing of cells along different paths of the flowchart laid out in FIGS. 1A and 1B.

In operation, the application or the programmer or designer of the multimedia experience selects a single path of the flowchart 150 and one or more representative timing regions are automatically generated for cells, including conditional cells and/or reference cells, along the selected single path. For example, the experience designer may select the single path that includes the cells 102 to 112, the cell 114 along the branch 132 and the cell 120 along branch 132a of the flowchart 150. FIGS. 3 and 3A illustrate timing regions 300 and 300A that may be generated for this selected single path. The timing region 300 provides a visualization of the timing for the cells 102 to 112, while the timing region 300A provides a visualization of the timing for the cells 114 and 120. In the present embodiment, two timing regions 300 and 300A are generated because the cell 112 requires user input and provides a user break point in the application flow along the selected path. Since the timing of the cell 114 relative to the cell 112 is indeterminate, two timing regions are generated. Alternatively, a single timing region could be generated for the single path described above, which concatenates or links the timing regions 300 and 300A. In this way, a single timing region could define a graphical representation of all of the cells along the selected single path, including the cells 102 to 112, 114 and 120, as a like number and arrangement of timing panes and action indicators.

Figure 3B:
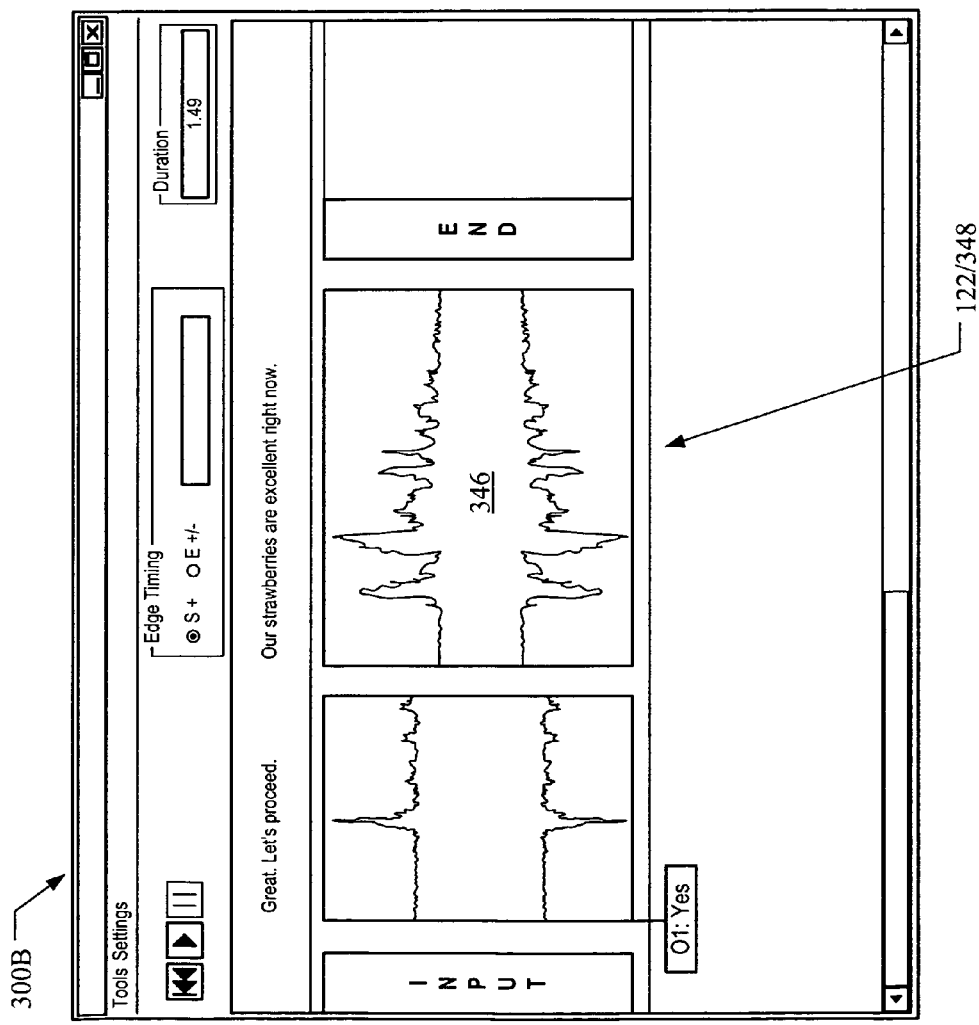

Also, it will be understood that the application or programmer may select a different single path that is of interest and the timing region(s) will automatically update to reflect the sequence of media for cells associated with the newly selected single path. For example, FIGS. 3A and 3B illustrate timing regions 300A and 300B that may be displayed when different single path are selected, including the branch 132 and the branches 132a and 132b, respectively. As previously discussed, the experience may playback either the cell 120 or the cell 122 in response to information previously provided with respect to the reference variable g.favorite_color.

FIG. 3A illustrates the timing region 300A that may be displayed when the selected single path includes the cells 102 to 112, branches 132 and 132a. Stated another way, along this selected path, the user has previously indicated a preference for the color blue. The timing pane 344 corresponds to the media cell 120 and displays the waveform 340 of the audio file to be played by the primary action associated with the cell 120, which as previously discussed informs the user that "I think you'll like our blueberry pie." An action indicator 342 shows that the pie carousel graphic associated with secondary action of the cell 120 is displayed zero point three-seven (0.37) seconds after the start of the primary action. Similarly, FIG. 3B illustrates the timing region 300B that may be displayed when the selected single path includes the cells 102 to 112, branch 132 and sub-branch 132b. Stated another way, along this selected path, the user has indicated a preference for the color red. A timing pane 348 displays the waveform 346 for the audio file associated with the cell 122, which as previously discussed, informs the user that "Our strawberries are excellent right now." The action indicator 342 can be selected, manipulated and adjusted with respect to the time axis t to modify or change the timing of the pie carousel graphic associated with cell 120 when the single path corresponding to the user preference for the color blue is selected. The programmer or designer can thus dynamically modify and iteratively evaluate the flow of the possible sequences of media, audio files, textual prompts, etc., for cells along different single paths of the flowchart 150.

Figure 4:
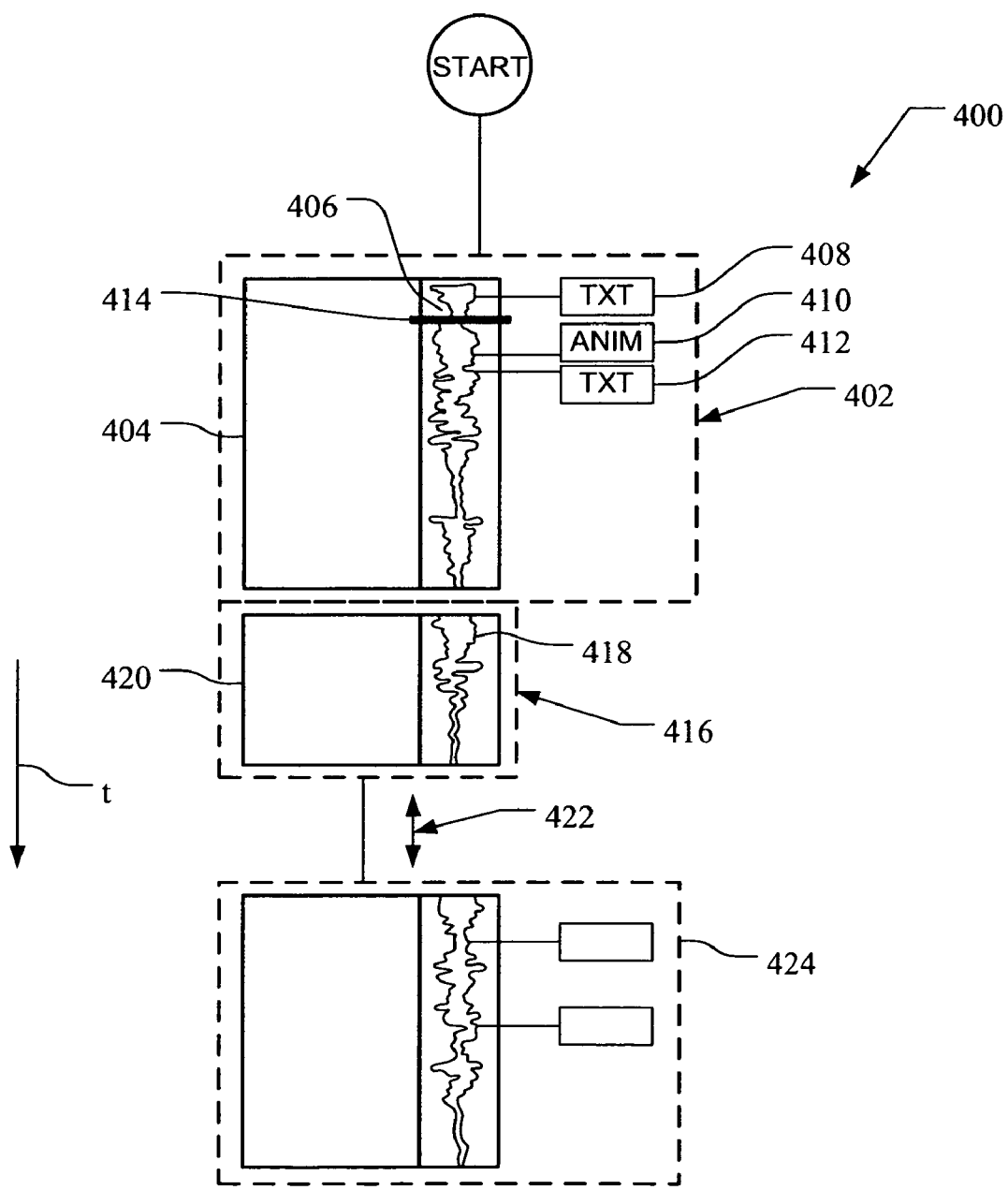
FIG. 4 illustrates an alternate embodiment of a timing tool that may be incorporated in a flowchart representative of a multimedia experience.

FIG. 4 illustrates an alternate embodiment of a timing tool 400 or region that could be incorporated into the flowchart 150. In this embodiment, the size and relative location of each cell to the remaining cells in the flowchart 150 is indicative of timing, duration and/or primary and secondary actions associated with each cell. A cell 402, in this exemplary embodiment defines a timing cell or an interactive multimedia timing cell, includes the elements and teachings disclosed in connection with the timing regions 300, 300A and 300B. For example, the cell 402 can include a primary action 404, a waveform 406 representative of the media, action, etc. associated with the cell 402, and secondary actions 408 to 412. Thus, as the experience proceeds from the start indicator to the cell 402, a playhead 414 or progress indicator, begins to translate or track along the waveform 406 to visually indicate the progress or play of the media, action, etc. In this example, the flowchart, individual cells, etc. are vertically aligned, thereby indicating that progress within the experience is measured from the top of the flowchart towards the bottom of the flowchart. In other words, the time axis t proceeds in the direction indicated by the arrow.

The vertical length of the cell 402 further indicates that the action or waveform associated with the cell 402 plays or executes for a greater length of time that the waveform 418 associated with the smaller cell 418. As discussed above in connection with the timing regions 300, 300A and 300B, the secondary actions 408 to 412 are actions, events, media files, text, etc. which are displayed or executed relative to the action associated with the primary action 404. In this embodiment, the secondary actions 408 to 412 are analogous to the action indicators discussed above. For example, the secondary action 408 may represent text to be presented during the execution of the experience. The time at which the secondary action 408 is displayed can be adjusted graphically by selecting and shifting the representative icon or action indicator relative to the waveform 406. Thus, as the cell 402 is activated, the playhead 414 translates along the waveform 406 and upon reaching the secondary action 408, the text, media, etc. associated with the particular secondary action is displayed or executed.

The cell 416 includes the waveform 418 associated with a primary action 420. The cell 416 abuts or contacts the cell 402 in a contiguous fashion. The relative location of the cells 402 to 416 indicates that the experience proceeds without pause from cell 402 to cell 416. Similarly, a gap 422 between the cell 416 and the cell 424 indicates a pause or dwell between the execution of the two cells 416 and 424. Thus, the relative timing between the cells 402, 416 and 424 can be quickly and easily adjusted by changing the relative spacing between these cells. Moreover, the relative size of each of these cells, i.e., the size difference between cell 416 and cell 402, indicates that length of time necessary to execute or complete the actions associated with that cell. In other words, the cell 416, e.g., a smaller sized cell, executes for a shorter amount of time than the cell 402, e.g., a larger sized cell.

It will be understood that the exemplary techniques and the timing region for controlling the timing of a multimedia experience that includes media cells having multiple actions can be implemented in multimedia experiences where additional actions associated with a parent cell, group of cells, etc., are graphically presented as child cells along branches or offshoots of the parent cell. In this instance the timing region can be configured to display one or more of the elements, properties and actions associated with a given parent cell in a timing pane before displaying a child cell and the properties associated therewith as action indicators.

The second display region or Editor Pane 200 can be associated or utilized with the timing tool 400 to allow properties, such as timing, text, graphics, etc. to be directly edited without having to directly interact with the icons or graphics associated with the cells 402, 416 and 424.

It will be understood that the application can be equipped with various functionality to allow it to facilitate the construction of the media assets scripted by the writer and for providing the programming necessary to fully render the interactive multimedia experience on a given platform. As noted above, cells can contain actions to be implemented, including instructions to play a media asset such as an audio file or a video file. When a writer is scripting the content of the interactive multimedia experience, those media assets may not yet exist. The application can sort the various pieces of desired media based on the talent that is necessary to create the media or on other criteria for sorting. For example, the actions in a media cell can be divided into music tasks, animation tasks, art tasks, programming tasks, SFX tasks, writing tasks, video tasks, and performance tasks. In this way, artists used to create the media can be assigned a list of tasks that need to be performed. When each of the media assets is created by the artists and inserted into designated "slots" in a database, the application can assemble the completed media for playback. The slots in the database can be created before or after the media assets are created. Because an interactive multimedia experience can have thousands of assets and a non-linear structure, it is preferred that the application maintain a database to track the media assets.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for controlling actions associated with a multimedia experience, the method comprising:
    generating a flowchart comprising a plurality of cells that include actions associated with a multimedia experience, wherein each of the plurality of cells represents a discrete portion of the multimedia experience and wherein the plurality of cells define a first path and a second path in the flowchart;
    in response to selecting the first path, generating automatically a first timing region, the first timing region configured to visually reflect a timing of two or more cells along the selected first path; and in response to selecting the second path, generating automatically a second timing region, the second timing region configured to visually reflect a timing of two or more cells along the selected second path.

2. The method of claim 1, wherein generating the first timing region includes displaying a graphical user interface that includes the first timing region.

3. The method of claim 2 wherein generating automatically the second timing region includes updating automatically the graphical user interface to display the second timing region in response to selecting the second path after selecting the first path.

4. The method of claim 1, wherein the first timing region includes an action indicator that represents a secondary action having a timing coordinated with a primary action associated with a cell in the selected first path, wherein the action indicator is displayed relative to a time axis of the primary action.

5. The method of claim 4, wherein the secondary action represents an instruction to trigger a piece of media for playback.

6. The method of claim 4 further comprising updating the timing of the secondary action relative to the primary action in response to adjusting the action indicator relative to a time axis.

7. The method of claim 1 further comprising playing back the two or more cells along the first path in the first timing region.

8. A method for controlling actions associated with a multimedia experience, the method comprising:
    generating a flowchart representing a multimedia experience having at least two separate branches;
    identifying a first path, the first path including the first branch;
    identifying a second path, the second path including the second branch;
    and
    generating a timing region, wherein generating the timing region includes:
        displaying automatically a plurality of timing panes representative of timing of actions associated with at least a portion of the first path in response to identifying the first path; and
        displaying automatically a plurality of timing panes representative of timing of actions associated with at least a portion of the second path in response to identifying the second path.

9. The method of claim 8, wherein generating the timing region includes displaying a graphical user interface that includes the timing region.

10. The method of claim 9 wherein generating the timing region includes updating automatically the user interface to display the plurality of timing panes representative of timing of actions associated with at least a portion of the second path in response to identifying the second path after identifying the first path.

11. The method of claim 8, wherein at least one timing pane includes an action indicator that represents an action associated with the at least a portion of the first path, wherein the action indicator is displayed relative to a time axis associated with the at least one timing pane based on the timing of the action.

12. The method of claim 11, wherein the action represents an instruction to trigger a piece of media for playback.

13. The method of claim 11 further comprising updating the timing of the action in response to adjusting the action indicator relative to the time axis.

14. The method of claim 8 further comprising playing back the portion of the first path in the first timing region.

15. A method for controlling actions associated with a multimedia experience, the method comprising:
    generating a flowchart having a plurality of cells, wherein each of the plurality of cells represents a discrete portion of the multimedia experience and wherein at least one cell associated with the plurality of cells includes a primary action configured to trigger playback of a primary media asset and at least one secondary action configured to trigger playback of a secondary media asset relative to the primary action;
    displaying a graphical view of the flowchart including a graphical representation of the at least one cell; and
    displaying within the graphical representation of the at least one cell a timing region configured to reflect the execution of the primary action and the at least one secondary action, wherein the timing region includes a graphical representation of the secondary media asset that is visually associated with a time axis of the primary media asset based on a timing of the primary action and the at least one secondary action.

16. The method of claim 15 wherein the timing region includes a progress indicator configured to indicate progress during playback of the primary media asset against the time axis.

17. The method of claim 15,
    wherein a size property of the at least one cell represents a duration of the primary media asset.

18. The method of claim 15, wherein a first cell is located at a first position in the flowchart and a second cell is located at a second position in the flowchart away from first position to define a gap
    wherein a distance measured by the gap represents a time duration between the execution of the first one first cell and the second cell.

19. The method of claim 15 further comprising adjusting the timing of the primary action and the at least one secondary action in response to adjusting the graphical representation of the secondary media asset relative to the time axis.

* * * * *